United States Patent
Gilliland et al.

(10) Patent No.: US 10,816,013 B2
(45) Date of Patent: Oct. 27, 2020

(54) REDUCED NOISE APPLIANCE

(71) Applicant: AMETEK, INC., Berwyn, PA (US)

(72) Inventors: Michael L. Gilliland, Streetsboro, OH (US); Robert A. Ciccarelli, Jr., Kent, OH (US); David B. Finkenbinder, Shippensburg, PA (US)

(73) Assignee: AMETEK, INC., Berwyn, PA (US)

( * ) Notice: Subject to any disclaimer, the term of this patent is extended or adjusted under 35 U.S.C. 154(b) by 0 days.

(21) Appl. No.: 16/253,588

(22) Filed: Jan. 22, 2019

(65) Prior Publication Data
US 2019/0154061 A1  May 23, 2019

Related U.S. Application Data

(63) Continuation of application No. 15/166,742, filed on May 27, 2016, now Pat. No. 10,221,865.
(Continued)

(51) Int. Cl.
*F04D 29/66* (2006.01)
*F04D 29/28* (2006.01)
(Continued)

(52) U.S. Cl.
CPC .......... *F04D 29/663* (2013.01); *A47J 43/085* (2013.01); *F04D 25/082* (2013.01);
(Continued)

(58) Field of Classification Search
CPC .... F04D 29/663; F04D 29/5806; F04D 29/30; F04D 29/281; F04D 29/4226;
(Continued)

(56) References Cited

U.S. PATENT DOCUMENTS 2,864,257 A   12/1958   Lappin et al.
3,051,856 A    8/1962   Hanschitz
(Continued)

FOREIGN PATENT DOCUMENTS

CN    1120891 A     4/1996   ............. A21C 11/11
CN    201855078 U   6/2011   ............. A47J 19/02
(Continued)

OTHER PUBLICATIONS

International Search Report dated Aug. 31, 2016 in related application No. PCT/US2016/034603.
(Continued)

*Primary Examiner* — Nathan C Zollinger
(74) *Attorney, Agent, or Firm* — Renner Kenner Greive Bobak Taylor & Weber

(57) ABSTRACT

An appliance provides a platform having a platform bottom and a platform base which supports a main base. A motor is carried by the platform base and rotates a ventilation fan which has a plurality of radial vanes with a fan aperture centrally positioned therein, such that the ventilation fan draws air in through an intake port provided by the platform. A fan shroud encloses the ventilation fan and has a shroud opening. The fan shroud extends from the platform base toward the platform bottom, wherein the main base surrounds the motor. The main base has an outer housing with at least one housing port, wherein rotation of the ventilation fan draws air into the fan aperture from the intake port, through the shroud opening, and expels the air radially from the plurality of radial vanes so that the air flows through the motor and out the housing port.

13 Claims, 2 Drawing Sheets

Related U.S. Application Data

(60) Provisional application No. 62/167,961, filed on May 29, 2015.

(51) Int. Cl.

| | | |
|---|---|---|
| *F04D 25/08* | (2006.01) | |
| *F04D 29/58* | (2006.01) | |
| *H02K 9/06* | (2006.01) | |
| *A47J 43/08* | (2006.01) | |
| *H02K 5/14* | (2006.01) | |

(52) U.S. Cl.
CPC ....... *F04D 29/281* (2013.01); *F04D 29/5806* (2013.01); *H02K 5/14* (2013.01); *H02K 9/06* (2013.01)

(58) Field of Classification Search
CPC ........ F04D 17/16; F04D 25/082; F04D 25/06; F04D 25/08; H02K 9/06; H02K 5/14; A47J 43/085
See application file for complete search history.

(56) References Cited

U.S. PATENT DOCUMENTS

| | | | | |
|---|---|---|---|---|
| 3,542,178 | A | 11/1970 | Ripple | 192/108 |
| 3,548,280 | A | 12/1970 | Cockroft | |
| 3,897,703 | A | 8/1975 | Phipps | 81/177 UJ |
| 3,901,484 | A | 8/1975 | Ernster | 259/108 |
| 5,069,569 | A | 12/1991 | Leiser | 403/57 |
| 5,696,358 | A | 12/1997 | Pfordresher | 181/198 |
| 6,595,113 | B1 | 7/2003 | Chang | 99/337 |
| 6,729,859 | B2 | 5/2004 | Masters | 417/366 |
| 7,320,542 | B2 | 1/2008 | Tat | 366/205 |
| 8,550,380 | B2 | 10/2013 | Machovina et al. | 241/261.1 |
| 8,616,482 | B2 | 12/2013 | Quinesser | 241/282.2 |
| 2006/0007778 | A1 | 1/2006 | Tai | 366/205 |
| 2006/0123996 | A1 | 6/2006 | Pavlovic et al. | 99/348 |
| 2006/0208119 | A1 | 9/2006 | Mally | 241/282.2 |
| 2014/0328684 | A1 | 11/2014 | King et al. | 416/95 |
| 2015/0351599 | A1* | 12/2015 | Park | H02K 1/14 417/423.2 |
| 2018/0263419 | A1* | 9/2018 | Nernberger | A47J 43/0716 |

FOREIGN PATENT DOCUMENTS

| | | | | |
|---|---|---|---|---|
| WO | WO 2004/041393 A1 | 5/2004 | | A63H 33/30 |
| WO | WO 2014/206844 A1 | 12/2014 | | A47J 43/08 |

OTHER PUBLICATIONS

Written Opinion dated Aug. 31, 2016 in related application No. PCT/US2016/034603.
Office Action dated Mar. 9, 2018 in related U.S. Appl. No. 15/166,742.
Response to Office Action dated Mar. 9, 2018 filed May 18, 2018 in related U.S. Appl. No. 15/166,742.
Final Office Action dated Sep. 5, 2018 in related U.S. Appl. No. 15/166,742.
Response to Final Office Action dated Sep. 5, 2018 filed Nov. 8, 2018 in related U.S. Appl. No. 15/166,742.
Advisory Action dated Oct. 12, 2018 in related U.S. Appl. No. 15/166,742.
Response to Advisory Action dated Dec. 10, 2018 as filed Jan. 4, 2019 in related U.S. Appl. Mo. 15/166,742.
Notice of Allowance dated Jan. 11, 2019 in related U.S. Appl. No. 15/166,742.

* cited by examiner

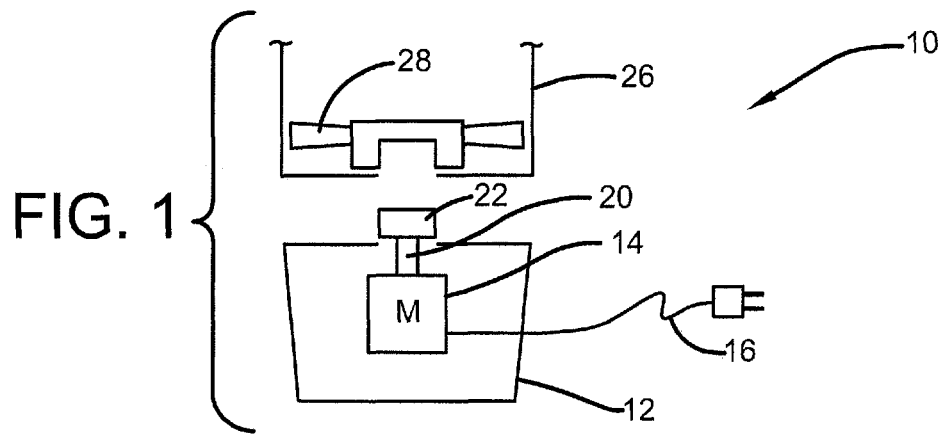
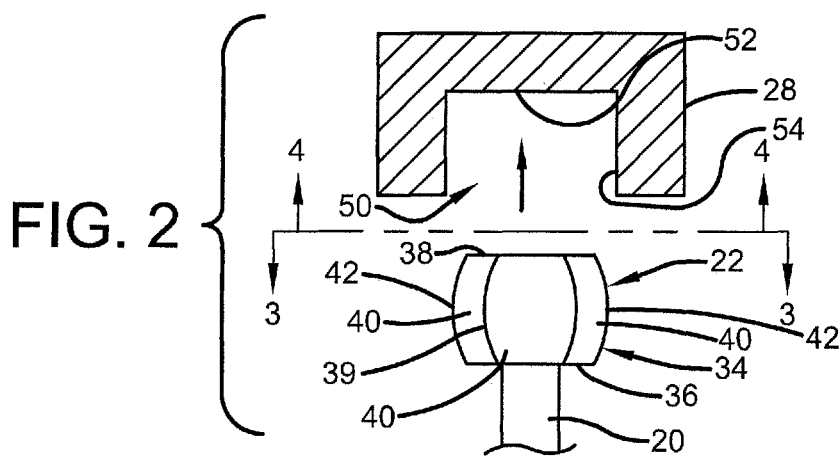
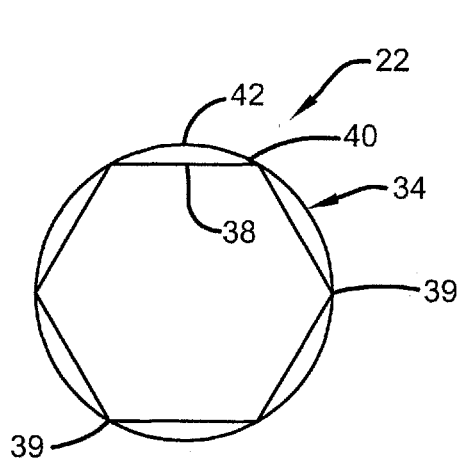
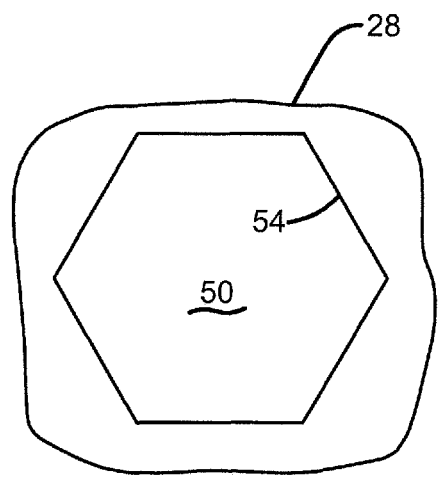

REDUCED NOISE APPLIANCE

CROSS-REFERENCE TO RELATED APPLICATIONS

This application is a Continuation application of Application Ser. No. 15/166,742 filed May 27, 2016, which claims priority of U.S. Provisional Application Ser. No. 62/167,961 filed May 29, 2015, both of which are incorporated herein by reference.

TECHNICAL FIELD

Generally, the present invention relates to a motor-operated appliance which includes a motor shaft with a coupling interface. Specifically, the present invention provides a motor-operated appliance which includes improved air flow features to reduce noise at high rotational speeds of the motor.

BACKGROUND ART

Motors are commonly used with appliances and the like to rotate a component of the appliance at a high operational speed. Some appliance configurations require that a portion of the appliance be de-coupled from the motor/motor base to facilitate their use. Examples of such appliances are consumer and industrial mixers, blenders and the like, wherein a container or bowl has a fixture that couples with a motor shaft.

Coupling a motor shaft to a receiving component is problematic in that the devices may be slightly misaligned due to poor tolerances. Poor alignment of the structure surrounding the shaft and receiving component may also contribute to misalignment.

Another problem with current appliances is that cooling air is first drawn in through and over the motor and then expelled by a fan. Conventional ventilating appliances are thermally managed by "pulling" air from a base section and exhausting that air through the appropriate port areas designed into the appliance base. This means that the noise spectrum generated at the ventilating fan exhaust perimeter is introduced directly into exhaust air passages and is transferred out to ambient. Moreover, such prior art configurations first transfer heated air from the motor through the fan. It is known that directing heated air through the fan reduces mass air flow, thus requiring more work by the motor and more air flow is then required for cooling. This additional work required by the motor in turn generates more noise from the fan. Prior art solutions to this problem include elaborate air passage baffling and the addition of sound deadening material to achieve a low system noise output, which adds complexity and cost to the configuration.

Misalignment of the motor shaft with the receiving component and poor heat management contribute to premature failure of the shaft and/or the receiving component and prevents the appliance from obtaining higher rotational speeds. Therefore, there is a need in the art to improve the air management features and to accommodate or improve the misalignment problem.

SUMMARY OF THE INVENTION

In light of the foregoing, it is a first aspect of the present invention to provide a reduced noise appliance.

It is another aspect of the present invention to provide an appliance, comprising a platform having a platform bottom and a platform base which supports a main base, the platform having at least one intake port, a motor carried by the platform base, the motor rotating a ventilation fan having a plurality of radial vanes with a fan aperture centrally positioned therein, the ventilation fan drawing air in through the at least one intake port, and a fan shroud enclosing the ventilation fan and having a shroud opening, wherein the fan shroud extends from the platform base toward the platform bottom, the main base surrounding the motor, the main base having an outer housing with at least one housing port, wherein rotation of the ventilation fan draws air into the fan aperture from the at least one intake port, through the shroud opening, and expels the air radially from the plurality of radial vanes so that the air flows through the motor and out the at least one housing port.

Still another aspect of the present invention is to provide an appliance, comprising a main base, a platform having a platform bottom and a platform base which supports the main base, the platform having at least one intake port, a motor carried by the platform base and extending into the main base, the motor rotating a ventilation fan that draws air in through the at least one intake port, and a fan shroud carried by the platform base and enclosing the ventilation fan, the fan shroud having a centrally disposed shroud opening, wherein the fan shroud extends from the platform base toward the platform bottom, wherein the centrally disposed shroud opening faces the platform bottom and the main base surrounds the motor, the main base having an outer housing with at least one housing port, wherein rotation of the ventilation fan draws air from the at least one intake port, through the centrally disposed shroud opening, and expels the air through the motor, into the main base and out the at least one housing port.

BRIEF DESCRIPTION OF THE DRAWINGS

These and other features and advantages of the present invention will become better understood with regard to the following description, appended claims, and accompanying drawings wherein:

FIG. 1 is a partial schematic drawing of an appliance according to the concepts of the present invention;

FIG. 2 is a schematic drawing of a multi-sided ball receivable in a pocket of a rotatable component according to the concepts of the present invention;

FIG. 3 is an end view taken along lines 3-3 of FIG. 2 of the multi-sided ball according to the concepts of the present invention;

FIG. 4 is an end view taken along lines 4-4 of FIG. 2 of the pocket according to the concepts of the present invention.

BEST MODE FOR CARRYING OUT THE INVENTION

Figure 5:
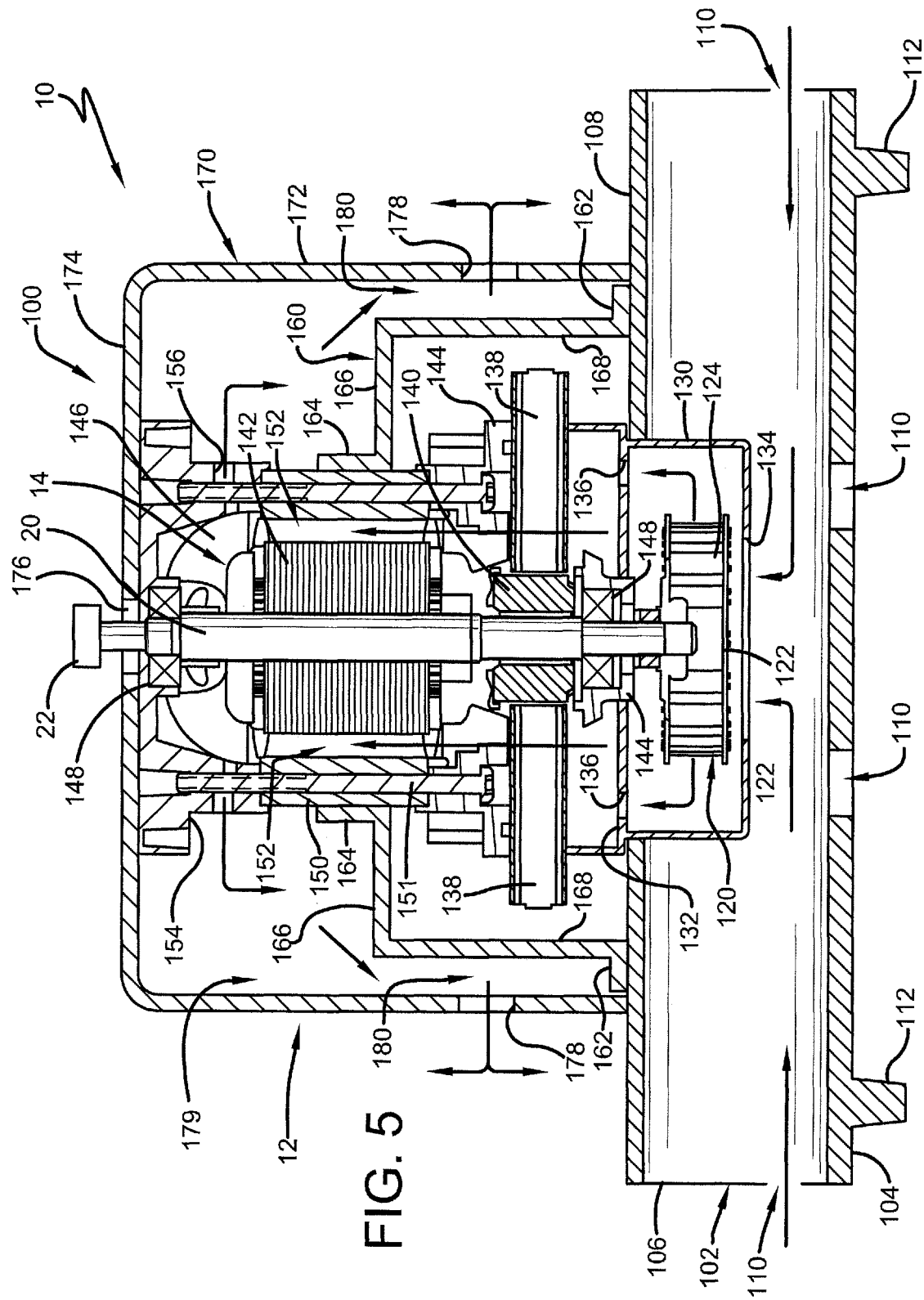
FIG. 5 is schematic diagram of a reverse air flow motor housing according to the concepts of the present invention.

Referring now to the drawings, and in particular to FIGS. 1-2, it can be seen that an appliance, which provides reduced-noise features, is designated generally by the numeral 10. The appliance includes a main base 12 which carries a motor 14. The motor 14 may be powered by mains power through an electrical cord 16 which supplies electricity to the motor, or the motor may be powered by a separate power supply or a number of batteries (not shown). Extending from the motor 14 is a shaft 20 which may be rotated in either direction.

A multi-sided ball 22 is secured to the end of the shaft 20 and is received by an attachment 26. As used herein, the term ball refers to a generally rounded shape which has one side truncated and secured to the shaft and an opposite side which may or may not be truncated. In some embodiments the attachment 26 may be a container such as a mixing bowl or pitcher as is used in a blender, wherein the attachment 26 includes a rotatable component 28. The rotatable component 28 is configured to receive the multi-sided ball 22.

As best seen in FIGS. 2-4, the multi-sided ball 22 includes a body 34 which provides a trailing end that is secured to the shaft 20 and which is opposite a leading end 38 which is received in the rotatable component 28. The body 34 includes at least two rounded sides 40 which extend from the trailing end 36 to the leading end 38. Any number of sides may be employed. In the embodiment shown, the ball 22 provides for six rounded sides in a quasi-hexagon configuration. Each rounded side 40 provides an apex 42 at about a midpoint of the ball between the trailing end 36 and leading end 38. Each rounded side intersects with an adjacent rounded side at an edge 39. The ball 22, and in particular the rounded side 40 provides a rounded curvature with a radius appropriate for the size of the receiving pocket.

The rotatable component 28 includes a paddle or blade used by the appliance 10 to perform its desired function. The rotatable component 28 provides a pocket 50 for receiving the multi-sided ball 22. The pocket 50 includes a bottom surface 52 and a multi-sided wall 54 wherein the number of sides of the multi-sided wall 54 match the number of rounded sides provided by the ball 22. In the present embodiment, each wall 54 may be provided at about a right angle with respect to the bottom 52. The angular configuration of the multi-sided walls 54 is similar to those provided by the sides 40 of the ball 22. The ball 22 is dimensionally sized so as to be receivable within the pocket 50. The apex 42 of each side 40 is sized so as to be in close proximity to the wall 54 when the ball is received in the pocket. In some embodiments the apex 42 may be frictionally fit with the corresponding wall 54.

In some embodiments, the position of the ball 22 and the pocket 50 may be switched. In other words, the pocket 50 may be integral with the motor shaft 20 and the multi-sided ball 22 may be integral with the rotatable component 28. Such a configuration provides the same advantages.

During operation of the appliance, it will be appreciated that as the shaft 20 turns, the rounded sides of the ball 22 engage the walls 54 of the pocket 50. The ability to slightly angularly insert the shaft and associated ball 22 into the pocket 50 accommodates any misalignment therebetween while still providing the desired torsional forces from the shaft to the rotatable component 28. It has been found that such a configuration provides for the desired torsional properties while also reducing noise generated from shafts that do not provide for a multi-sided ball as shown and described.

Referring now to FIG. 5, it can be seen that a reverse air flow motor housing is designated generally by the numeral 100. The motor housing 100 includes the main base 12 which carries the motor 14 from which extends the motor shaft 20. The shaft 20, in this embodiment, may provide for the multi-sided ball 22 or some other configuration receivable in the attachment 26. It will be appreciated that the appliance 10 may not provide the ball 22 and only the features associated with the housing 100.

The main base 12 includes a lower platform 102 which may include a platform bottom 104 from which extends a platform sidewall 106. Supported by the platform sidewall 106 is a platform base 108 which may support and/or carry the motor 14. The platform sidewall 106 may provide at least one air intake port 110. Skilled artisans will also appreciate that in some embodiments the air intake port 110 may be provided or may extend through the platform bottom 104 wherein the platform bottom 104 may be elevated by a plurality of feet 112 which are supported by any available surface.

A ventilation fan 120, which may be considered as part of the motor 14, is attached to an end of the shaft 20 opposite the attachment end that carries the multi-sided ball 22 or other attachment feature. The ventilation fan 120 includes a fan aperture 122 at the approximate center thereof which may be aligned with the shaft 20. A plurality of radial vanes 124 are provided by the fan wherein the aperture 122 is positioned centrally within the radial vanes 124. A fan shroud 130 partially encloses the fan 120 and is mounted to an underside of the platform base 108. The fan shroud may also include a fan end plate 132 which may be mounted to the platform base 108. The fan shroud 130 may provide for a centrally disposed shroud opening 134 which is aligned with the fan aperture 122. In the present embodiment, at least one plate aperture 136 may extend through the fan end plate 132. Skilled artisans will appreciate that although the fan end plate 132 may offer noise reduction advantages, other structural features within the housing 100 also reduce noise generated by the ventilation fan 120. As shown, the shroud 130 extends into the lower platform 102 substantially its entire width. However, in some embodiments, it will be appreciated that the shroud may be positioned at any desired depth or may be flush with the platform base 108. In other words, the shroud opening 134 may be in the same plane as the platform base 108.

The motor 14 includes a pair of opposed carbon brushes 138 which are positioned so as to contact a rotor 140 as is well known in the art. The rotor 140 is fixedly attached to the shaft 20 which extends through a motor core 142. A brush bracket 144 may be employed to hold the brushes 138 in place. Motor windings 146 are spaced from and surround the core as is also well known in the art. Bearings 148 are disposed around and near each end of the shaft so as to rotatably support the shaft and allow for rotation thereof when electric power is applied to the brushes 138. The brush bracket 144 may also hold the bearings 148 and may also be structurally supported by the fan end plate 132. In some embodiments, the brush bracket 144 may be supported or carried by the end plate 132, and in other embodiments the brush bracket 144 may be supported or carried by the platform base 108. And in other embodiments, a combination of the end plate 132 and the base 108 may support or carry the brush bracket 144 and as a result the other parts of the motor 14.

A casing 150 spaces and supports components of the motor 14 and may extend from the brush bracket 144 and/or the fan end plate 132. The casing 150 carries at least one fastener 151 that may extend therethrough. The casing 150 may be spaced apart from the motor core 142 so as to form casing passages 152 therebetween. An end bracket 154 may be secured around and mounted to the casing 150 at an end of the motor opposite the end plate 132. The bracket 154 also functions to hold the bearings 148 in an operative position with the shaft 20. The at least one fastener 151 effectively secures the brush bracket 144, the casing 150 and the end bracket 154 to one another. The end bracket 154 may provide at least one bracket opening 156 therethrough which may be radially oriented. In other words, the at least one bracket opening 156 extends through the end bracket and is contiguous with the casing passage 152. In the embodiment shown, the end bracket 154 may be maintained within the motor housing 100.

Maintained within the motor housing 100 may be an inner support 160. The inner support 160 may include a platform leg 162 which may be attached to, otherwise supported by or maintained in close proximity to the platform base 108 or other nearby structure. At an end opposite the platform leg 162 is a casing leg 164 which may be attached to, otherwise supported by or maintained in close proximity to the motor casing 150. As shown, a casing support 166 radially extends from the casing leg 164 and effectively from the casing. A platform support 168 may extend substantially perpendicularly from the casing support 166 and is connected to the platform leg 162. It will be appreciated that the inner support 160 may provide structural support of the motor with respect to the platform base 108. The support 160 may also provide a sound barrier to assist in muffling noises generated by operation of the motor 14 and/or the ventilation fan 124. The inner support 160 substantially surrounds a lower half of the motor 14 while also providing structural support which maintains an airflow in a generally axial direction through the casing and in an opposite generally axial direction between the inner support and an outer housing 170 as will be described.

The motor housing 100 may include an outer housing 170 which may extend radially from the end bracket 154 and surrounds or substantially encloses the inner support 160 and is further supported by the platform base 108. The outer housing 170 includes a housing sidewall 172 which has a housing end 174 with a shaft opening 176 therethrough. The housing end 174 may be adjacent to and/or in a contacting positional relationship with the appropriate facing surface of the end bracket 154. In any event, it will be appreciated that the shaft 20 extends through the shaft opening 176. The outer housing may be provided with at least one housing port 178. In one embodiment, the housing sidewall 172 may provide the port 178. In the embodiment shown, the housing port 178, which may also be called a sidewall port, is juxtapositioned near the inner support 160. However, the sidewall ports 178 may be positioned anywhere along the housing sidewall 172 and about an outer periphery of the housing end 174 that is radially removed from the end bracket 154.

Together, the inner support 160 and the outer housing 170 provide a passageway for air exiting from the motor casing 150 to be directed to ambient. In the embodiment shown, the outer housing together with the inner housing route air flow that passes from the bracket opening 156 toward the ports 178. The casing support 166, the housing end 174, the casing 150 and an upper portion of the sidewall 172 form a cavity 179 which is contiguous with the end bracket aperture 156. Air that exits from the bracket opening 156 and which carries the associated noise spectrum, deflects off of the various surfaces that form the cavity and, as a result, serves to reduce the noise. The platform support, the platform leg, and/or the platform base, and a lower portion of the sidewall 172 form a chamber 180, which may be annular in shape. The chamber 180 is contiguous with the cavity 179 and the sidewall ports 178. After collecting in the cavity 179, the air flow from the fan 124 is directed into the chamber and then out to ambient.

In operation, rotation of the shaft 20 operates the appliance as previously described. Simultaneously, rotation of the shaft results in rotation of the ventilation fan 120 which generates an airflow represented by the enlarged arrows in FIG. 5. Rotation of the fan 120 results in air being drawn in through the air intake port or ports 110 and through the shroud opening 134. Subsequently, the air travels through the fan aperture 122 and is then expelled radially by the vanes 124 into the fan shroud 130. The apertures 136 extend through the fan end plate 132 and allow for the ventilation air to then travel through the motor casing openings and/or passages 152 between the core and the casing as shown in FIG. 5. Skilled artisans will appreciate that rotation of the shaft and electricity flowing through the electrical components within the motor generate heat and the flowing ventilation air transfers the heat and expels it out through the bracket openings 156. This air then travels within the cavity 179 and the chamber 180 between an inner surface of the outer housing 170 and an exterior surface of the inner support 160 until such time that it passes through the side wall ports 178.

The present reverse air flow motor housing 100 ventilates air flow and the associated noise spectrum in a direction that is reverse, leading to the benefit of reduced noise. In contrast to the prior art configurations, air is "pushed" into a motor housing by the ventilating fan. The system ventilation or cooling air and noise spectrum are directed into the housing interior and cooling air thermally manages the housing interior components and is subsequently exhausted to ambient through housing section port areas. The appliance housing and related structure also acts as a muffler, reducing the noise amount introduced into ambient. Noise reduction may be accomplished without the addition of a noise abatement material or additional air passage baffling. As such, the present platform and housing configuration serves dual purposes in that it houses the components and also muffles fan noise. Skilled artisans will appreciate that if desired further abatement strategies, such as the use of sound dampening material, may further reduce noise. The disclosed configuration allows noise abatement without the need to increase the size of the housing in view of the housing's dual role of housing components and abating noise. Cooling fan noise generated by the fan air intake feature is substantially less than the exhaust perimeter noise. This fact gives the reverse air flow configuration a noise platform lower than conventional ventilated appliance systems where exhaust noise is directly exposed to ambient air.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. An appliance, comprising:
    a platform having a platform bottom and a platform base which supports a main base, said platform having at least one intake port;
    a motor carried by said platform base, said motor rotating a ventilation fan having a plurality of radial vanes with a fan aperture centrally positioned therein, said ventilation fan drawing air in through said at least one intake port;
    a fan shroud enclosing said ventilation fan and having a shroud opening, wherein said fan shroud extends from said platform base toward said platform bottom, said main base surrounding said motor, said main base having an outer housing with at least one housing port, wherein rotation of said ventilation fan draws air into said fan aperture from said at least one intake port, through said shroud opening, and expels the air radially from said plurality of radial vanes so that the air flows through said motor and out said at least one housing port;
a casing that encloses portions of said motor, wherein said casing is positioned between said motor and outer housing and said casing includes a plurality of passages through which air passes from said platform through said at least one housing port;
a brush bracket disposed at one end of said motor;
an end bracket disposed at an opposite end of said motor; and
at least one fastener connecting said brush bracket, said casing and said end bracket to each other.

2. The appliance according to claim 1, further comprising:
a fan end plate positioned between said ventilation fan and said motor, said fan end plate having at least one plate aperture therethrough, wherein air drawn in through said fan shroud passes through said at least one plate aperture.

3. The appliance according to claim 1, further comprising:
an inner support radially positioned entirely around said casing and is positioned in between said casing and at least one of said main base and said platform, said inner support and said main base forming a chamber therebetween, wherein said at least one housing port is contiguous with and radially adjacent said chamber.

4. The appliance according to claim 1, further comprising:
an inner support positioned between said casing and one of said main base and said platform, wherein air flows through said plurality of passages to an exterior of said inner support and through said at least one housing port.

5. The appliance according to claim 2, wherein said fan aperture is aligned with said shroud opening, wherein rotation of said ventilation fan draws in air through said at least one air intake port, through said shroud opening into said fan aperture, and wherein said plurality of radial vanes expel the air radially, whereupon the air passes through said at least one plate aperture.

6. The appliance according to claim 1, wherein said fan aperture is aligned with said shroud opening.

7. An appliance, comprising:
a main base;
a platform having a platform bottom and a platform base which supports said main base, said platform having at least one intake port;
a motor carried by said platform base and extending into said main base, said motor rotating a ventilation fan that draws air in through said at least one intake port;
a fan shroud carried by said platform base and enclosing said ventilation fan, said fan shroud having a centrally disposed shroud opening, wherein said fan shroud extends from said platform base toward said platform bottom, wherein said centrally disposed shroud opening faces said platform bottom and said main base surrounds said motor, said main base having an outer housing with at least one housing port, wherein rotation of said ventilation fan draws air from said at least one intake port, through said centrally disposed shroud opening, and expels the air through said motor, into said main base and out said at least one housing port;
a casing that encloses portions of said motor, wherein said casing is positioned between said motor and said outer housing and said casing includes a plurality of passages through which air passes from said platform through said at least one housing port;
a brush bracket disposed at one end of said motor;
an end bracket disposed at an opposite end of said motor; and
at least one fastener connecting said brush bracket, said casing and said end bracket to each other.

8. The appliance according to claim 7, further comprising:
a fan end plate positioned between said ventilation fan and said motor, said fan end plate having at least one plate aperture therethrough, wherein air drawn in through said fan shroud passes through said at least one plate aperture.

9. The appliance according to claim 7, further comprising:
an inner support radially positioned entirely around said casing and is positioned between said casing and at least one of said main base and said platform, said inner support and said main base forming a chamber therebetween, wherein said at least one housing port is contiguous with and radially adjacent said chamber.

10. The appliance according to claim 7, wherein said ventilation fan has a plurality of radial vanes with a fan aperture centrally positioned therein and which is aligned with said centrally disposed shroud opening, wherein rotation of said ventilation fan draws in air through said at least one air intake port, through said centrally disposed shroud opening into said ventilation fan, and wherein said plurality of radial vanes expel the air radially, whereupon the air passes through said motor, into said main base and out said at least one housing port.

11. The appliance according to claim 7, wherein said ventilation fan has a plurality of radial vanes with a fan aperture centrally positioned therein and which is aligned with said centrally disposed shroud opening.

12. An appliance, comprising:
a platform having a platform bottom and a platform base which supports a main base, said platform having at least one intake port;
a motor carried by said platform base, said motor rotating a ventilation fan having a plurality of radial vanes with a fan aperture centrally positioned therein, said ventilation fan drawing air in through said at least one intake port;
a fan shroud enclosing said ventilation fan and having a shroud opening, wherein said fan shroud extends from said platform base toward said platform bottom, said main base surrounding said motor, said main base having an outer housing with at least one housing port, wherein rotation of said ventilation fan draws air into said fan aperture from said at least one intake port, through said shroud opening, and expels the air radially from said plurality of radial vanes so that the air flows through said motor and out said at least one housing port;
a casing that encloses portions of said motor, wherein said casing provides plurality of passages through which air passes from said platform through said at least one housing port;
a fan end plate positioned between said ventilation fan and said motor, said fan end plate having at least one plate aperture therethrough, wherein air drawn in through said fan shroud passes through said at least one plate aperture;
an inner support positioned between said casing and at least one of said main base and said platform, said inner support and said main base forming a chamber therebetween, wherein said at least one housing port is contiguous with said chamber;
a brush bracket disposed at one end of said motor;

an end bracket disposed at an opposite end of said motor; and at least one fastener connecting said brush bracket, said casing and said end bracket to each other.

13. The appliance according to claim 12, wherein said fan aperture is aligned with said shroud opening, wherein rotation of said ventilation fan draws in air through said at least one air intake port, through said shroud opening into said fan aperture, and wherein said plurality of radial vanes expel the air radially, whereupon the air passes through said at least one plate aperture.

\* \* \* \* \*